(12) United States Patent
Kania et al.

(10) Patent No.: US 8,007,582 B2
(45) Date of Patent: Aug. 30, 2011

(54) UV CURABLE COATING COMPOSITION AND METHOD OF MAKING

(75) Inventors: Charles M. Kania, Natrona Heights, PA (US); Debra L. Singer, Wexford, PA (US); Diane J. Schillinger, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 639 days.

(21) Appl. No.: 11/760,215

(22) Filed: Jun. 8, 2007

(65) Prior Publication Data

US 2008/0302273 A1 Dec. 11, 2008

(51) Int. Cl.
*D21H 17/07* (2006.01)
*C08G 18/67* (2006.01)

(52) U.S. Cl. .................. 106/287.25; 522/90; 522/174

(58) Field of Classification Search ............... 522/1, 90, 522/174; 106/287.25
See application file for complete search history.

(56) References Cited

U.S. PATENT DOCUMENTS

| 3,799,854 | A | 3/1974 | Jerabek ..................... 204/181 |
| 4,147,679 | A | 4/1979 | Scriven et al. ............. 260/29.2 |
| 4,220,679 | A | 9/1980 | Backhouse ................. 427/401 |
| 4,403,003 | A | 9/1983 | Backhouse ................. 427/407.1 |
| 5,071,904 | A | 12/1991 | Martin et al. ............... 524/458 |
| 6,284,321 | B1 | 9/2001 | Brindoepke et al. ........ 427/385.5 |
| 6,387,519 | B1 * | 5/2002 | Anderson et al. .......... 428/447 |
| 2002/1009912 | | 7/2002 | Wenning et al ............. 524/451 |
| 2003/0130372 | A1 * | 7/2003 | Wenning et al. ............ 522/173 |
| 2004/0077742 | A1 | 4/2004 | Hilger et al. ................ 522/1 |

FOREIGN PATENT DOCUMENTS

EP  0 633 912  9/1998

* cited by examiner

*Primary Examiner* — Mark Eashoo
*Assistant Examiner* — Jessica Paul
(74) *Attorney, Agent, or Firm* — Steven W. Hays

(57) ABSTRACT

The present invention relates to solid, particulate free film-forming compositions, multi-layer composite coatings comprising such film-forming compositions and methods of applying such multi-component composite coatings to a substrate. The solvent free film-forming compositions include UV-curable powder coating compositions comprising an amorphous (meth)acrylate terminated poly(ester-urethane) and optionally a second (meth)acrylate terminated polyurethane.

13 Claims, No Drawings

US 8,007,582 B2

UV CURABLE COATING COMPOSITION AND METHOD OF MAKING

FIELD OF THE INVENTION

The present invention relates to solid, particulate film-forming compositions, multi-layer composite coatings comprising such film-forming compositions and methods of applying such multi-component composite coatings to a substrate.

BACKGROUND INFORMATION

Color-plus-clear coating systems formed from the application of a transparent topcoat over a colored basecoat have become increasingly popular in the coatings industry, particularly for use in coating automobiles.

Over the past decade, there has been an effort to reduce atmospheric pollution caused by volatile solvents that are emitted during the painting process. It is, however, often difficult to achieve high quality, smooth coating finishes, particularly clear coating finishes, such as are required in the automotive industry, without including organic solvents which contribute greatly to flow and leveling of a coating. In addition to achieving near-flawless appearance, automotive coatings must be durable and chip resistant, yet economical and easy to apply.

The use of powder coatings to eliminate the emission of volatile solvents during the painting process has become increasingly attractive. Powder coatings have become quite popular for use in coatings for automotive components, for example, wheels, axle parts, seat frames and the like. The use of powder coatings for clear coats in color-plus-clear systems, however, is somewhat less prevalent for several reasons. First, powder coatings require a different application technology than conventional liquid coating compositions and thus, require expensive modifications to application lines. Also, most automotive topcoat compositions typically are cured at temperatures below 140° C. By contrast, most powder coating formulations require a much higher curing temperature. Further, many powder coating compositions tend to yellow more readily than conventional liquid coating compositions, and generally result in coatings having a high cured film thickness, often ranging from 60 to 70 microns.

Powder coatings in slurry form for automotive coatings can overcome many of the disadvantages of dry powder coatings. However, powder slurry compositions can be unstable and settle upon storage at temperatures above 20° C. Some aqueous dispersions are known to form powder coatings at ambient temperatures. Although applied as conventional waterborne coating compositions, these dispersions form powder coatings at ambient temperature that require a ramped bake prior to undergoing conventional curing conditions in order to effect a coalesced and continuous film on the substrate surface. Also, many waterborne coating compositions contain a substantial amount of organic solvent to provide flow and coalescence of the applied coating.

The automotive industry would derive a significant economic benefit from an essentially organic solvent-free clear coating composition which meets the stringent automotive appearance and performance requirements, while maintaining ease of application and performance properties. Also, it would be advantageous to provide an organic solvent-free clear coat composition which can be applied by conventional application means over an uncured pigmented base coating composition to form a generally continuous film at ambient temperature which provides a cured film with good appearance and good performance properties.

SUMMARY OF THE INVENTION

The present invention is directed to UV-curable powder coating compositions comprising an amorphous (meth)acrylate terminated poly(ester-urethane) comprising the reaction product of an amorphous polyester polyol having an OH number of greater than 150 and an adduct of polyisocyanate and a hydroxyl functional (meth)acrylate, and the amorphous (meth)acrylate terminated poly(ester-urethane) having a melt viscosity at 125° C. and 150° C. such that the delta is no greater than 20,000 cps.

DETAILED DESCRIPTION OF EMBODIMENTS OF THE INVENTION

The present invention is directed to solid, particulate UV-curable coating compositions comprising an amorphous (meth)acrylate terminated poly(ester-urethane) comprising the reaction product of an amorphous polyester polyol having an OH number of greater than 150 and an adduct of polyisocyanate and a hydroxyl functional (meth)acrylate. The difference in the melt viscosity of the amorphous (meth)acrylate terminated poly(ester-urethane) measured at 125° C. and 150° C. is no greater than 20,000 cps.

Polyester polyols may be prepared by polycondensation of suitable polycarboxylic acids or acid anhydrides thereof and polyols. Suitable polycarboxylic acids or acid anhydrides may include aliphatic and cycloaliphatic anhydrides such as hexahydrophthalic anhydride, methyl hexahydrophthalic anhydride, succinic anhydride, chlorendic anhydride, and mixtures thereof. Suitable polyols may be selected from known diols, triols, higher functional polyols and mixtures thereof. Non-limiting examples include pentaerythritol, neopentylglycol, dicidol, trimethylolpropane, and mixtures thereof. In an embodiment, the polyol contains alkyl branching. In a further embodiment, the polyol contains hydroxylalkyl branching such as trimethylolpropane. In another embodiment, the polyol comprises a mixture of a polyol having a hydroxyl functionality of three or greater and a diol. Suitable diols include monoethylene glycol, 1,2- and 1,3-propylene glycol, 1,4- and 2,3-butylene glycol, 1,5-pentanediol, 1,6-hexanediol, 1,8-octanediol, decanediol, dodecanediol, neopentylglycol, cyclohexanediol and mixtures thereof. In an embodiment, the weight ratio of polyol having a functionality of three or greater to diol may be from 0.5 to 1.0:1. In another embodiment, the polyol for use in the present invention may have a chain length of from $C_2$ to $C_4$, or from $C_2$ to $C_3$, between the hydroxyl groups.

The polyester polyols for use in the present invention have an OH number of greater than 150, or greater than 160.

The polyisocyanate may be selected from aliphatic polyisocyanates and cycloaliphatic polyisocyanates, including but not limited to cycloaliphatic diisocyanates and higher-functional isocyanates. Non-limiting examples may include 1,4-tetramethylene diisocyanate, 1,6-hexamethylene diisocyanate, 1,4-cyclohexyl diisocyanate and isophorone diisocyanate. Aromatic polyisocyanates such as 4,4'-diphenylmethane diisocyanate and toluene diisocyanates may be used, but are not preferred. Higher functionality polyisocyanates such as diisocyanates may be used. Examples include the isocyanurates of 1,6-hexamethylene-diisocyanate and isophorone diisocyanate.

In addition, the polyisocyanates may be prepolymers derived from polyols such as polyether polyols or polyester polyols that are reacted with excess polyisocyanates to form isocyanate-terminated prepolymers. Examples of the suitable isocyanate prepolymers are described in U.S. Pat. No. 3,799,854, column 2, lines 22 to 53, which is herein incorporated by reference.

Non-limiting examples of suitable hydroxyl functional (meth)acrylates may include hydroxyl alkyl (meth)acrylates having 2 to 4 carbon atoms in the hydroxyl-alkyl group including hydroxyethyl (meth)acrylate, hydroxylpropyl (meth)acrylate, 4-hydroxylbutyl (meth)acrylate, and the like. Also hydroxyl functional adducts of caprolactone and hydroxylalkyl (meth)acrylates can be used. In an embodiment, the hydroxyl functional (meth)acrylate is a hydroxylalkyl ester of (meth)acrylic acid containing from 2 to 4 carbon atoms in the alkyl group.

In an embodiment, the hydroxyl functional (meth)acrylate is hydroxyethyl (meth)acrylate, hydroxypropyl (meth)acrylate or mixtures thereof.

In another embodiment, the adduct of the polyisocyanate and hydroxyl functional (meth)acrylate is monofunctional with respect to isocyanate.

To prepare the amorphous (meth)acrylate terminated poly(ester-urethane), the polyisocyanate, optionally with a tin catalyst, is combined with the hydroxyl functional (meth)acrylate and optionally a free radical polymerization inhibitor such as IONOL CP which is commercially available from Shell, to form an adduct. The equivalent ratio of polyisocyanate to hydroxyl functional adduct (NCO/OH equivalent ratio) is greater than 1:1, for example about 2:1, so as to form an isocyanate-containing reaction product. The adduct is then reacted with a polyester polyol having an OH number of greater than 150. The polyester polyol is present in a NCO:OH equivalent ratio of greater than 1. In an embodiment, the NCO:OH equivalent ratio is from 1.5 to 2.5:1. The reaction mixture is then heated to a temperature of from 80 to 140° C. and held at this temperature to complete the reaction. The NCO:OH equivalent ratio is such that the reaction product is substantially free of NCO. In an embodiment, the amount of NCO in the reaction product is less than 0.1%. This can be accomplished by having the NCO:OH equivalent ratio less than 1. In an embodiment, the NCO:OH equivalent ratio is from 1:1.1 to 1.2.

The difference in the melt viscosity of the amorphous (meth)acrylate terminated poly(ester-urethane) measured at temperatures of 125° C. and 150° C. is no greater than 20,000 cps. The melt viscosity is a measure of flow response. The lower the measured number, the lower the resistance to flow, and typically, the smoother the final film. The melt viscosity can be measured using a Brookfield Model DV-II viscometer equipped with #21 spindle. The test is performed by placing the copolymer in a cell which is then loaded into a heated oven. When the copolymer begins to melt, the #21 spindle is lowered into the cell and rotated. The melt viscosity in centipoise is plotted versus time in minutes. The lowest viscosity recorded, prior to gelling of the copolymer is taken as the melt viscosity. The measurement in centipoise (cps) is taken at the curing temperature of the copolymer, typically 275° F. (135° C.) at 1 revolution per minute (rpm).

In addition to the amorphous (meth)acrylate terminated poly(ester-urethane), the powder coating compositions may also contain a second (meth)acrylate terminated polyurethane. In an embodiment, the difference in the melt viscosity of the second (meth)acrylate terminated polyurethane measured at 125° C. and 150° C. is greater than the difference in the melt viscosity of the amorphous (meth)acrylate terminated poly(ester-urethane) measured at 125° C. and 150° C. In another embodiment, the difference in the melt viscosity of the (meth)acrylate terminated polyurethane measured at 125° C. and 150° C. is at least 30,000 cps. The melt viscosity can be measured as described above. Examples of suitable second (meth)acrylate functional polyurethanes are described in United States Patent Publication 2002/0099127, paragraphs [0045] through [0051].

A preferred (meth)acrylate terminated polyurethane is prepared from reacting (a) a polyisocyanate with (b) the reaction product of (i) a polyol having at least three hydroxyl groups, one of which is less reactive than the other hydroxyl groups and (ii) a (meth)acrylic acid or a functional equivalent thereof.

The equivalent ratio of (ii) to (i) is (n−1):n where n is the hydroxyl functionality of the polyol and the equivalent ratio of (a) to (b) is about 1:1.

Examples of suitable polyisocyanates are those mentioned above. In an embodiment, the polyisocyanates are aliphatic and cycloaliphatic diisocyanates and triisocyanates such as the isocyanurates of 1,6-hexamethylene diisocyanate and isophorone diisocyanate.

Suitable polyols include triols such as glycerol.

Non-limiting examples of (b)(ii) are acrylic acid, methacrylic acid and anhydrides thereof. In a non-limiting embodiment (b)(ii) is glycerol di-methacrylate which is commercially available from Degussa.

In an embodiment, the (meth)acrylate functional polyurethane can be prepared by reacting glycerol di-methacrylate and a polyisocyanate in the above mentioned equivalent ratio. A polymerization inhibitor such as IONOL may also be present in the reaction mixture. The reaction is conducted at a temperature of from 51 to 142° C. over 2.5 to 3.5 hours to form the meth)acrylate functional polyurethane.

In the above mentioned scheme, the (meth)acrylic acid or anhydride reacts with the two most reactive groups of the triol leaving the less reactive group to react with the polyisocyanate. In the case of the reaction product of acrylic acid, glycerol and a diisocyanate, the reaction scheme and reaction product could look as follows:

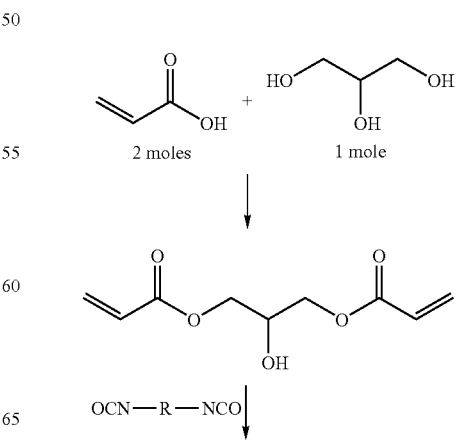

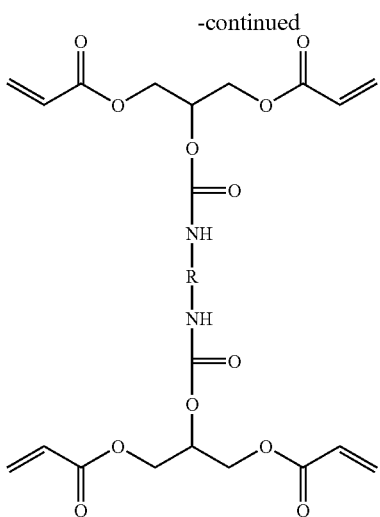

where R is the organic residue between the isocyanate groups.

The amorphous (meth)acrylate terminated poly(ester-urethane) and the second (meth)acrylate terminated polyurethane are typically mixed in a ratio of from 60:40 to 90:10 percent by weight. In an alternate embodiment, the amorphous (meth)acrylate terminated poly(ester-urethane) and the second (meth)acrylate terminated polyurethane can be combined in one resinous molecule. For example, the amorphous (meth)acrylate terminated poly(ester-urethane) can be prepared such that it has unreacted hydroxyl groups. The second (meth)acrylate terminated polyurethane can be prepared such that it contains unreacted NCO-functionality that allows it to be reacted into the backbone of the amorphous (meth)acrylate terminated poly(ester-urethane).

Typically, an UV initiator which is known in principle from conventional liquid UV curing systems, as described, for example in EP 633912, may be present. This is a material which upon irradiation with UV light decomposes into free radicals and so initiates the polymerization. UV initiators may be selected from such materials known in the art. Suitable UV initiators include, for example, 2,2'-diethoxyacetophenone, hydroxylcyclohexyl phenyl ketone, benzophenone, 2-hydroxyl-2-methyl-1-phenylpropan-1-one, xanthone, thioxanthone, benzyl dimethyl ketal, and the like. Such UV initiators are commercially available, for example, IRGA-CURE 184 or DEGACURE 1173 from Ciba. The fraction of the overall system attributable to the photoinitiator is about 0.5 to 5% by weight based on total weight of the composition.

Optional additives include (meth)acrylate-containing compounds, for example, the triacrylate of tris(2-hydroxylethyl)isocyanurate (SR 386; Sartomer), and adhesion promoters, which may be used in minor fractions of from 0 to 20% by weight based on total weight of the composition, to modify the coating properties.

Further additives customary in the case of powder coatings are flow agents, light stabilizers and degassing agents. These can be used in an amount of from 0 to 5% by weight based on total weight of the coating composition.

The UV-curable powder coating composition of the present invention can be prepared by mixing the ingredients (i.e., resins and additives) using standard techniques, for example, the ingredients can be homogenized in suitable assemblies, for example, heatable kneaders. The ingredients may be homogenized by extrusion, in which case upper temperature limits of from 120-130° C. should not be exceeded.

In an alternate embodiment, instead of using extrusion to homogenize the ingredients, the formulation can be prepared in the reactor where the UV-curable resin is prepared. For example, the UV-curable resin is prepared in the reactor and while still hot, the various additives are fed into the reactor and dispersed throughout the hot resin. The mixture is then cooled and fed to chiller rolls and flakers.

The UV-curable powder coating composition of the present invention may be applied to a substrate or to a base coat by any appropriate means that are known to those of ordinary skill in the art. Generally, the UV-curable powder coating composition is in the form of a dry powder and is applied by spray application. Alternatively, the powder can be slurried in a liquid medium, such as water, and spray applied.

When the substrate is electrically conductive, the UV-curable powder coating composition is typically electrostatically applied. Electrostatic spray application generally involves drawing the UV-curable powder coating composition from a fluidized bed and propelling it through a corona field. The particles of the UV-curable powder coating composition become charged as they pass through the corona field and are attracted to and deposited upon the electrically conductive substrate, which is grounded. As the charged particles begin to build up, the substrate becomes insulated, thus limiting further particle deposition. This insulating phenomenon typically limits the film build of the deposited composition to a maximum of 10 to 12 mils (250 to 300 microns), in some cases, 3 to 6 mils (75 to 150 microns).

Alternatively, when the substrate is not electrically conductive, for example as is the case with many plastic substrates, the substrate is typically preheated prior to application of the UV-curable powder coating composition. The preheated temperature of the substrate may be equal to or greater than that of the melting point of the UV-curable powder coating composition, but less than its cure temperature. With spray application over preheated substrates, film builds of the UV-curable powder coating composition in excess of 6 mils (150 microns) can be achieved, e.g., 10 to 20 mils (254 to 508 microns).

The UV-curable powder coating compositions described above can be applied to various substrates to which they adhere, including wood; metals, such as ferrous substrates and aluminum substrates; glass; plastic and sheet molding compound based on plastics.

The present invention is further directed to a multi-component composite coating composition that includes: (a) a base coat deposited from a pigmented film-forming composition; and (b) a transparent top coat applied over the base coat, where the transparent top coat is deposited from the UV-curable powder coating composition of the present invention. The multi-component composite coating composition as described herein is commonly referred to as a color-plus-clear coating composition.

The base coat may be deposited from a powder coating composition as described above or from a liquid thermosetting composition. When the base coat is deposited from a liquid thermosetting composition, the composition is allowed to coalesce to form a substantially continuous film on the substrate. The film is formed on the surface of the substrate by driving solvent, i.e., organic solvent and/or water, out of the film by heating or by an air drying period. The heating may be only for a short period of time, sufficient to ensure that any subsequently applied coatings can be applied to the film without dissolving the composition. Suitable drying conditions will depend on the particular composition. More than one coat of the composition may be applied to develop the optimum appearance. Between coats, the previously applied coat may be flashed, that is, exposed to ambient conditions for a time period of from 1 to 20 minutes.

After application to the substrate, the liquid thermosetting composition, when used as the base coat, then may be coalesced to form a substantially continuous film. Coalescing of the applied composition is generally achieved through the application of heat at a temperature equal to or greater than that of the melting point of the composition, but less than its cure temperature. In the case of preheated substrates, the application and coalescing steps can be achieved in essentially one step.

The coalesced thermosetting composition is next cured by the application of heat. As used herein, by "cured" is meant a three-dimensional crosslink network formed by covalent bond formation, e.g., between the reactive functional groups of the film forming material and the crosslinking agent. The temperature at which the thermosetting composition of the present invention cures is variable and depends in part on the type and amount of catalyst used. Typically, the thermosetting composition has a cure temperature within the range of from 120° C. to 180° C., or from 130° C. to 160° C.

The pigmented film-forming composition from which the base coat is deposited can be any of the compositions useful in coatings applications, particularly automotive applications in which color-plus-clear coating compositions are extensively used. Pigmented film-forming compositions conventionally comprise a resinous binder and a pigment to act as a colorant. Particularly useful resinous binders are acrylic polymers, polyesters including alkyds, and polyurethanes.

The resinous binders for the pigmented film-forming base coat composition can be organic solvent-based materials, such as those described in U.S. Pat. No. 4,220,679, see column 2, line 24 through column 4, line 40. Also, water-based coating compositions, such as those described in U.S. Pat. Nos. 4,403,003; 4,147,679; and 5,071,904.

Ingredients that may be optionally present in the pigmented film-forming base coat composition are those which are well known in the art of formulating surface coatings, and include surfactants, flow control agents, thixotropic agents, fillers, anti-gassing agents, organic co-solvents, catalysts, and other customary auxiliaries. Examples of these optional materials and suitable amounts are described in the aforementioned U.S. Pat. Nos. 4,220,679; 4,403,003; 4,147,679; and 5,071,904.

The pigmented film-forming base coat composition can be applied to the substrate by any of the conventional coating techniques, such as brushing, spraying, dipping, or flowing, but are most often applied by spraying. The usual spray techniques and equipment for air spraying, airless spraying, and electrostatic spraying employing either manual or automatic methods can be used. The pigmented film-forming composition is applied in an amount sufficient to provide a base coat having a film thickness typically of 0.01 to 5 mils (0.254 to 125 microns) or 0.1 to 2 mils (2.5 to 50 microns).

After deposition of the pigmented film-forming base coat composition onto the substrate, and prior to application of the transparent top coat, the base coat can be cured or alternatively dried. In drying the deposited base coat, organic solvent and/or water is driven out of the base coat film by heating or the passage of air over its surface. Suitable drying conditions will depend on the particular base coat composition used and on the ambient humidity in the case of certain water-based compositions. In general, drying of the deposited base coat is performed over a period of from 1 to 15 minutes, or 1 to 5 minutes, and at a temperature of from 20° C. to 121° C., or from 21° C. to 93° C.

The transparent top coat is applied over the deposited base coat by any of the methods by which coatings are known to be applied. In an embodiment of the present invention, the transparent top coat is applied by electrostatic spray application as described previously herein. When the transparent top coat is applied over a deposited base coat that has been dried, the two coatings can be co-cured to form the multi-component composite coating composition of the present invention.

After application of the UV-curable powder coating composition to one of the aforementioned bases, the composition layer, optionally after a short flash-off phase, is exposed to high-energy radiation, such as UV radiation. UV radiation sources which emit in the wavelength range of from 180 to 420 nm, or from 200 to 400 nm, can be used. Examples of such UV radiation sources are optionally doped high-pressure, medium-pressure and low-pressure mercury vapour radiators, gas discharge tubes such as, for example, low-pressure xenon lamps, pulsed and unpulsed TV lasers, UV spot radiators such as, for example, UV-emitting diodes and black light tubes. In an embodiment, irradiation is with pulsed UV radiation. The total duration of irradiation is in the region of a few seconds, for example within the range of 3 milliseconds to 400 seconds, or from 4 to 160 seconds.

For purposes of the following detailed description, it is to be understood that the invention may assume various alternative variations and step sequences, except where expressly specified to the contrary. It is also to be understood that the specific devices and processes are simply exemplary embodiments of the invention. Hence, specific dimensions and other physical characteristics related to the embodiments disclosed herein are not to be considered as limiting. Moreover, other than in any operating examples, or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

It should also be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

Further, it should be understood that plural encompasses singular and vice versa; for example, "a" or "an" can include more than one. For instance, although all references made herein are to "an" amorphous (meth)acrylate terminated poly (ester-urethane), "an" amorphous polyester polyol, "a" polyisocyanate, "a" hydroxyl functional (meth)acrylate and "a" second (meth)acrylate terminated polyurethane, and the like, one or more of any of these compounds or things can be used. As used herein, the prefix "poly" refers to two or more.

Illustrating the invention are the following examples, which, however, are not to be considered as limiting the invention to their details. Unless otherwise indicated, all parts and percentages in the following examples, as well as throughout the specification, are by weight.

EXAMPLES

Examples 1 through 4 show the preparation of second (meth)acrylate terminated polyurethanes and Examples 5 through 7 show the preparation of (meth)acrylate terminated polyurethane, in which the difference in melt viscosity of the second (meth)acrylate terminated polyurethanes measured at 125° C. and 150° C. is greater than the difference in melt viscosity at these temperatures of the amorphous (meth)acrylate terminated poly(ester-urethane). Example 8 shows various UV curable powder coating compositions comprising amorphous (meth)acrylate terminated poly(ester-urethane) and a second (meth)acrylate terminated polyurethane. The powder curable compositions were used as clear coats in composite color and clear coatings.

Example 1

Preparation of (Meth)Acrylate Terminated Polyurethane

In a 12-liter round bottom flask equipped with an agitator and thermocouple the following materials were added to form a slurry.

| | |
|---|---|
| T-1890[1] | 6000 grams |
| Hydroxyethyl Acrylate | 2875 grams |
| IONOL[2] | 48.81 grams |
| Triphenyl Phosphite | 9.76 grams |
| Dibutyl Tin Dilaurate | 4.88 grams |

[1]T-1890 - Trimer of Isophorone Diisocyanate available from DeGussa
[2]IONOL - Available from Merisol as Antioxidant BHT The reaction slurry was heated to a temperature in the range of 40-45° C. and then heat removed. The material was allowed to exotherm to a maximum temperature of 145° C. The batch was held at temperature in the range of 140-145° C. until there was substantially no NCO present as determined by IR. The material was poured onto a flat sheet and allowed to cool after which the material was crushed into smaller pieces.

The material had the following properties:
Tg as determined by TA Instruments DSC was 51.05° C.
Mw as determined by Gel Permeation Chromatography (GPC) using a polystyrene standard was 1200.
Melt viscosity at 125° C. was 64,400 cps.
Melt viscosity at 150° C. was 5,900 cps.

Example 2

Preparation of (Meth)Acrylate Terminated Polyurethane

To a 3-liter flask equipped with an agitator, thermocouple and feed ports, the following materials were added:

| | |
|---|---|
| T-1890 | 1886 grams |
| DESN 3300 | 95 grams |
| IONOL | 9.84 grams |
| Triphenyl Phosphite | 1.97 grams |
| Dibutyl Tin Dilaurate | 0.98 grams |

The material was heated to melting at a temperature of 102° C. A vacuum was applied to remove 565.71 grams of solvent. The strip time was about 50 minutes. Charge A was then added over a 30-minute period at rate to control the exotherm.

Charge A

| | |
|---|---|
| Hydroxy Ethyl Acrylate | 552 grams |

Upon completion of adding Charge A, the reaction was held until an NCO EW of about 1585 was achieved. The temperature was 131° C. When the NCO EW was achieved, Charge B was added.

Charge B

Dimethylol Propionic Acid—83.75 grams

The reaction was held at a temperature between 131 and 143° C. until the NCO peak was gone as demonstrated by IR. The material was poured onto a flat sheet and allowed to cool; it was then crushed into smaller pieces.

The product had the following properties:
Melt viscosity at 125° C. was 36,400 cps.
Melt viscosity at 150° C. was 2,280 cps.

Example 3

Preparation of (Meth)Acrylate Terminated Polyurethane

In a 12-liter round bottom flask equipped with an agitator and thermocouple the following materials were added to form a slurry.

| | |
|---|---|
| T-1890 | 5280 grams |
| Hydroxyethyl Methacrylate | 2860 grams |
| IONOL | 44.77 grams |
| Triphenyl Phosphite | 8.95 grams |
| Dibutyl Tin Dilaurate | 4.477 grams |

The reaction slurry was heated to a temperature in the range of from 40-45° C. and then the heat was removed. The material was allowed to exotherm to a maximum temperature of 145° C. The batch was held at a temperature in the range of from 140-145° C. until there was substantially no NCO present as determined by IR. The material was poured onto a flat sheet and allowed to cool, after which the material was crushed into smaller pieces.

The material had the following properties:
Tg as determined by TA Instruments DSC was 50° C.
Mw as determined by Gel Permeation Chromatography (GPC) using a polystyrene standard was 1200.
Melt viscosity at 125° C. was 47,500 cps.
Melt viscosity at 150° C. was 4,200 cps.

Example 4

Preparation of (Meth)Acrylate Terminated Polyurethane

In a 5-liter round bottom flask equipped with an agitator and thermocouple the following materials were added.

| | |
|---|---:|
| T-1890 | 1392.47 grams |
| Triphenyl Phosphite | 1.362 grams |
| IONOL | 12.22 grams |
| Dibutyl Tin Dilaurate | 0.812 grams |
| Glycerol Dimethacrylate[3] | 1325.75 grams |

[3] Available from Degussa as Mhoromer D-1108

The reactor mixture was heated to melting (130° C.) at which point the heat was removed. The glycerol dimethacrylate was added to the reactor at a rate to minimize the exotherm. Cooling was applied while the reaction began to exotherm. The addition of the glycerol dimethacrylate took 90 minutes and the maximum temperature was 160° C. The reaction was then held at 150° C. and monitored for NCO (unreacted isocyanate) by IR. After 45 minutes, IR indicated there was substantially no NCO present and the reaction was complete. The molten material was removed from the flask onto cooling trays and then broken into pieces.

The material had the following properties:
Tg as determined by TA Instruments DSC was 58° C.
Mw as determined by Gel Permeation Chromatography (GPC) using a polystyrene standard was 3411.
Melt viscosity at 125° C. was 32,000 cps.
Melt viscosity at 150° C. was 5,500 cps.

Example 5

Polyester Prepolymer

In a 12-liter round bottom flask equipped with an agitator, thermocouple, nitrogen gas inlet tube and distillation head with a steam column, the following materials were added.

| | |
|---|---:|
| Pentaerythritol | 1531 grams |
| Neopentyl Glycol | 1856 grams |
| 2,2,4-Trimethyl-1,3-Pentane Diol | 1096 grams |
| Hexahydrophthalic Anhydride | 3850 grams |
| Butylstannoic Acid | 30.01 grams |
| Triphenyl phosphite | 18.50 grams |

This reaction mixture was heated to a temperature of 90° C., at which point the heat input was discontinued. The reaction was allowed to exotherm to 141° C. At this point all of the materials were melted and the nitrogen cap was switched to a nitrogen sparge. The reactor contents were then heated to 200° C. at which time the distillation of water began. The batch was then heated to 220° C. After 430 grams of water had distilled, the acid value of the resin was found to be 8.8. The reaction was then cooled slightly and poured. The resin was a solid at room temperature with the following properties:
% Solids=96.7%
Acid Value=8.8
Hydroxyl Number=319.7
Mw as determined by GPC=2045

Example 6

Unsaturated Urethane Oligomer

To a 12-liter flask equipped with an agitator, thermocouple, air inlet tube, condenser and feed ports, the following materials were added:

| | |
|---|---:|
| Isophorone diisocyanate | 3774 grams |
| Dibutylin Tin Dilaurate | 2.71 grams |
| IONOL | 3.31 grams |

This blend of materials was heated to a temperature of 38° C. A total of 2243 grams of hydroxyethyl acrylate was then added over a period of 6 hours while cooling the batch to maintain a temperature of between 40 and 45° C. After the addition was completed, the batch was maintained at 50° C. for 1 hour. The reaction mixture was then poured out. The resin was a viscous liquid at room temperature with the following properties:
% Solids=96.8%
Isocyanate equivalent weight=419.5
Mw as determined by GPC=620

Example 7

Unsaturated Urethane for UV Cure

To a 12-liter flask equipped with an agitator, thermocouple, air inlet tube, condenser and feed ports, the following materials were added:

| | |
|---|---:|
| Polyester Prepolymer Resin from Example 5 | 1989 grams |
| Unsaturated Urethane Oligomer from Example 6 | 3573 grams |
| Dibutyltin Tin Dilaurate | 2.78 grams |
| IONOL | 13.9 grams |

This blend was heated to a temperature of 80° C. under a flow of air. At 80° C., the heat was turned off and the mixture was allowed to exotherm to a temperature of 125° C. The reaction mixture was held at 125° C. for a period of 20 to 30 minutes. The reaction mixture was then heated to 130° C. and poured while still hot. The resin was found to be a friable solid at room temperature with the following properties:
% Solids=98.7%
Mw as determined by GPC=3320
Viscosity at 125° C.=13,100 cps
Viscosity at 150° C.=5,500 cps

Example 8

UV Powder Clear Coat Compositions

UV cure powder clear coat compositions identified as Examples A through D in Table I were prepared using the components and amounts (parts by weight) shown, and processed in the following manner.

The components were blended in a Henschel Blender for a period of 60 to 90 seconds. The mixtures were then extruded through a Werner & Pfleider co-rotating twin screw extruder at a screw speed of 450 RPM and an extrudate temperature of 100° C. to 125° C. The extruded material was then ground to a mean particle size of between 17 and 27 um using an ACM 2 (Air Classifying Mill from Hosakowa Micron Powder Systems). The finished powders were electrostatically sprayed onto test panels and evaluated for appearance.

TABLE I

| Description | Example A | Example B | Example C |
|---|---|---|---|
| Polymer Example 1 | 39.6 | | |
| Polymer Example 3 | | 39.4 | |
| Polymer Example 4 | | | 39.4 |
| Polymer Example 7 | 24.9 | 24.7 | 24.7 |
| UVECOAT 9146[1] | 29.4 | 29.6 | 29.6 |
| Irgacure 819[2] | 0.5 | 0.7 | 0.7 |
| Irgacure 2959[3] | 1.5 | 1.5 | 1.5 |
| Powdermate 570FL[4] | 1.1 | 1.1 | 1.1 |
| Tinuvin 144[5] | 1.0 | 1.0 | 1.0 |
| Tinuvin 405[6] | 2.0 | 2.0 | 2.0 |
| Total | 100.0 | 100.0 | 100.0 |

[1] An aliphatic unsaturated acrylic urethane polymer commercially available from Cytec Surface Specialties, Romano d'Ezzelino, Italy.
[2] A flow and leveling additive commercially available form Troy Corporation.
[3] 1-4-(2-Hydroxyethoxy)-phenyl-2-hydroxy-2-methyl-1-propane-1-one, a non-yellowing radical photo-initiator commercially available from Ciba Specialty Chemicals, Basel, Switzerland.
[4] Bis(2,4,6-trimethylbenzoyl)-phenylphosphineoxide, a photoinitiator for radical polymerization of unsaturated resins upon UV light exposure commercially available from Ciba Specialty Chemicals, Basel, Switzerland.
[5] 2-tert-butyl-2-(4-hydroxy-3,5-di-tert-butylbenzyl) [bis(methyl-2,2,6,6-tetramethyl-4-piperidinyl)]dipropionate), an ultraviolet light stabilizer commercially availabie from Ciba Specialty Chemicals, Basel, Switzerland.
[6] (2-[4((2-Hydroxy-3-(2-ethylhexyloxy)propyl)-oxy]-2-hydroxyphenyl)-4,6-bis(2,4-dimethylphenyl)-1,3,5-triazine), an ultraviolet light stabilizer commercially available from Ciba Specialty Chemicals, Basel, Switzerland.

The powder coating compositions of Examples A through C were prepared for testing in the following manner. The test panels were pre-coated with an electrocoat primer and solventborne primer surfacer commercially available from PPG Industries, Inc. as ED6060 and 1177225A, and then coated with a basecoat by spray application to a film thickness of from 0.4-0.6 mils (10.2-15.2 microns). The basecoat was a waterborne black basecoat commercially available from BASF Corporation. The basecoat panels were flashed for a period of 7 minutes at a temperature of 158° F. (70° C.) before electrostatically applying the powder clearcoat compositions of Examples A through C. The powder coatings were applied at a film thickness of from 35-45 microns and cured by thermally heating the panels for 20 minutes at 149° C. and then exposed to UV light with an energy exposure of 1000 mJ/cm$^2$. The UV light used to cure the panels was emitted from a standard Mercury H-bulb. The panels were then tested for coating properties that included 20° Gloss, Longwave, and cross-hatch adhesion properties. The 20° Gloss measurement was taken on a Byk-Gardner Haze/Gloss Meter and the Longwave measurement was taken using a Byk-Gardner Wavescan Plus. The results are tabulated in Table II.

TABLE II

| | Example A | Example B | Example C |
|---|---|---|---|
| 20° Gloss | 85 | 86 | 85 |
| Longwave | 3 | 4 | 3.5 |
| *Cross-Hatch Rating | 5 | 4 | 5 |

*Cross-Hatch Rating Scale
5 = The edges of the cuts are completely smooth and none of the lattice squares is detached.
4 = Small flakes of coating are detached at intersections, Less than five percent of the area is affected.
3 = Small flakes of the coating are detached along edges and at intersections of cuts. The area affected is five to fifteen percent of the lattice.
2 = The coating has flaked along the edges and on parts of the squares. The area affected is fifteen to thirty-five percent of the lattice.
1 = The coating has flaked along the edges of cuts in large ribbons and whole squares have detached. The area affected is thirty-five to sixty-five percent of the lattice.
0 = Flaking and detachment worse than rating 1. Over sixty-five percent of the lattice is affected.

The data presented in Table II illustrates that the powder clearcoat composition of the present invention provide cured high gloss coating films with excellent flow and leveling.

We claim:

1. A UV-curable powder coating composition comprising an amorphous (meth)acrylate terminated poly(ester-urethane) comprising the reaction product of:
   (A) an amorphous polyester polyol having an OH number of greater than 160 mg KOH/g, the amorphous polyester polyol being prepared by polycondensation of (i) a polycarboxylic acid or acid anhydride thereof; and (ii) a polyol, the polyol comprising a mixture of a polyol having hydroxyl functionality of three or greater and a diol, wherein the weight ratio of the polyol having hydroxyl functionality of three or greater to diol is from 0.5 to 1.0:1, and
   (B) an adduct of polyisocyanate and a hydroxyl functional (meth)acrylate, the adduct being monofunctional with respect to isocyanate;
   in which the difference in the melt viscosity of the amorphous (meth)acrylate terminated poly(ester-urethane) measured at temperatures of 125° C. and 150° C. is no greater than 20,000 cps.

2. The composition of claim 1 in which the adduct of the polyisocyanate and the hydroxyl functional (meth)acrylate is monofunctional with respect to isocyanate.

3. The composition of claim 1 in which the polyol has a chain length of from C2 to C4 between hydroxyl groups.

4. The composition of claim 3 in which the polyol has a chain length of from C2 to C3 between hydroxyl groups.

5. The composition of claim 1 in which the polyisocyanate comprises an aliphatic or cycloaliphatic polyisocyanate.

6. The composition of claim 1 in which the hydroxyl functional (meth)acrylate is selected from hydroxyalkyl (meth)acrylates having 2 to 4 carbon atoms in the hydroxyl-alkyl group.

7. The composition of claim 1 further comprising a second (meth)acrylate terminated polyurethane that is the reaction product of:
   (a) a polyisocyanate; and
   (b) the reaction product of (i) a polyol having at least three hydroxyl groups, one of which is less reactive than the other hydroxyl groups; and (ii) a (meth)acrylic acid or functional equivalent thereof; wherein the equivalent ratio of (i) to (ii) is: (n−1):n; wherein n is the hydroxyl functionality of the polyol; and wherein the equivalent ratio of (a) to (b) is about 1:1;
   in which the difference in the melt viscosity of the second (meth)acrylate terminated polyurethane measured at temperatures of 125° C. and 150° C. is greater than the difference in melt viscosity of the amorphous (meth)acrylate terminated polyester-urethane) measured at temperatures of 125° C. and 150° C.

8. The composition of claim 7 wherein the difference in the melt viscosity of the second (meth)acrylate terminated polyurethane measured at temperatures of 125° C. and 150° C. is at least 30,000 cps.

9. A multi-component composite coating composition comprising a base coat deposited from a pigmented film-forming composition and a transparent topcoat applied over the base coat in which the transparent topcoat is deposited from a UV curable powder coating composition comprising:
   (A) an amorphous (meth)acrylate terminated poly(ester-urethane) comprising the reaction product of an amorphous polyester polyol having an OH number of greater than 160 mg KOH/g, the amorphous polyester polyol being prepared by polycondensation of (i) a polycarboxylic acid or acid anhydride thereof; and (ii) a polyol, the polyol comprising a mixture of a polyol having hydroxyl functionality of three or greater and a diol, wherein the weight ratio of the polyol having hydroxyl functionality of three or greater to diol is from 0.5 to 1.0:1, and (B) an adduct of polyisocyanate and a hydroxyl functional (meth)acrylate, the adduct being monofunctional with respect to isocyanate;

in which the difference in the melt viscosity of the amorphous (meth)acrylate terminated poly(ester-urethane) measured at temperatures of 125° C. and 150° C. is no greater than 20,000 cps.

10. The composition of claim 9 in which the polyol has a chain length of from C2 to C4 between hydroxyl groups.

11. The composition of claim 10 in which the polyol has a chain length of from C2 to C3 between hydroxyl groups.

12. The composition of claim 9 further comprising a second (meth)acrylate terminated polyurethane that is the reaction product of:

(a) a polyisocyanate; and (b) the reaction product of (i) a polyol having at least three hydroxyl groups, one of which is less reactive than the other hydroxyl groups; and (ii) a (meth)acrylic acid or functional equivalent thereof; wherein the equivalent ratio of (i) to (ii) is: (n−1):n; wherein n is the hydroxyl functionality of the polyol; and wherein the equivalent ratio of (a) to (b) is about 1:1;

in which the difference in the melt viscosity of the second (meth)acrylate terminated polyurethane measured at temperatures of 125° C. and 150° C. is greater than the difference in melt viscosity of the amorphous (meth) acrylate terminated poly(ester-urethane) measured at temperatures of 125° C. and 150° C.

13. The composition of claim 12 wherein the difference in the melt viscosity of the second (meth)acrylate terminated polyurethane measured at temperatures of 125° C. and 150° C. is at least 30,000 cps.

* * * * *